US010030627B2

(12) United States Patent
Rorres (10) Patent No.: US 10,030,627 B2
(45) Date of Patent: Jul. 24, 2018

(54) METHODS AND APPARATUS FOR MOVING FLUID USING A STRAKE

(71) Applicant: Chris Rorres, Wynnewood, PA (US)

(72) Inventor: Chris Rorres, Wynnewood, PA (US)

(73) Assignee: Chris Rorres, Wynnewood, PA (US)

( * ) Notice: Subject to any disclaimer, the term of this patent is extended or adjusted under 35 U.S.C. 154(b) by 365 days.

(21) Appl. No.: 14/430,245

(22) PCT Filed: Sep. 24, 2013

(86) PCT No.: PCT/US2013/061366
§ 371 (c)(1),
(2) Date: Mar. 23, 2015

(87) PCT Pub. No.: WO2014/047619
PCT Pub. Date: Mar. 27, 2014

(65) Prior Publication Data
US 2015/0247484 A1    Sep. 3, 2015

Related U.S. Application Data

(60) Provisional application No. 61/704,753, filed on Sep. 24, 2012.

(51) Int. Cl.
*F03B 3/12*    (2006.01)
*F03B 3/10*    (2006.01)
(Continued)

(52) U.S. Cl.
CPC .............. *F03B 3/121* (2013.01); *F03B 3/103* (2013.01); *F03B 7/00* (2013.01); *F03B 13/00* (2013.01);
(Continued)

(58) Field of Classification Search
CPC .......... F03B 3/121; F03B 13/00; F03B 3/103; F03B 7/00; F04D 3/02; F05B 2240/243
See application file for complete search history.

(56) References Cited

U.S. PATENT DOCUMENTS

| 28,526 | A | * | 5/1860 | Wappich | .................. F04D 3/02 |
| | | | | | 415/72 |
| 99,272 | A | * | 1/1870 | Zimmerman | ............. F04D 3/02 |
| | | | | | 416/177 |

(Continued)

FOREIGN PATENT DOCUMENTS

| EP | 0527227 A1 | 2/1993 |
| WO | 2007068973 A1 | 6/2007 |

(Continued)

OTHER PUBLICATIONS

STIC Search Results, USPTO, Generated Oct. 2017.*

(Continued)

*Primary Examiner* — Eldon Brockman
(74) *Attorney, Agent, or Firm* — Joseph F. Aceto, Esq.

(57) ABSTRACT

The present invention provides improved methods, apparatus, and manufacture for an Archimedes Screw using a strake design as a blade to increase the volume of water raised or lowered by about 10%. The invention, in part, alters the shape of the blades within the screw from a helicoid shape to a strake shape. A helicoid blade in an Archimedes Screw has been used since antiquity and has not changed since then, limiting the efficiency and manufacturing process. The strake shape allows a greater quantity of water to be contained within the screw and is a developable surface that enables easier fabrication than the helicoid shape.

15 Claims, 7 Drawing Sheets

Panel A

Panel B (51) Int. Cl.
  *F03B 7/00* (2006.01)
  *F04D 3/02* (2006.01)
  *F03B 13/00* (2006.01)
(52) U.S. Cl.
  CPC .......... *F04D 3/02* (2013.01); *F05B 2240/243* (2013.01); *Y02E 10/223* (2013.01); *Y02P 70/525* (2015.11); *Y10T 29/49242* (2015.01)

(56) References Cited

U.S. PATENT DOCUMENTS

| | | | | |
|---|---|---|---|---|
| 393,897 | A * | 12/1888 | Goff | F04D 3/02 415/125 |
| 398,855 | A * | 3/1889 | Smith | F04D 3/02 415/74 |
| 1,051,260 | A * | 1/1913 | Richards | F04D 3/02 415/72 |
| 1,058,790 | A * | 4/1913 | Pierce | F01D 1/18 415/72 |
| 1,132,775 | A * | 3/1915 | Hille | F04D 3/02 415/124.1 |
| 1,458,850 | A * | 6/1923 | Rath | F04D 3/02 416/177 |
| 3,282,825 | A * | 11/1966 | Brown | B01D 61/44 204/295 |
| 3,426,852 | A * | 2/1969 | Kinsey | B64C 11/005 415/72 |
| 3,737,249 | A | 5/1973 | Cooper | |
| 4,019,830 | A * | 4/1977 | Reid | F04D 3/02 415/124.1 |
| 4,239,449 | A * | 12/1980 | Bauer | F04B 19/12 415/73 |
| 4,500,259 | A * | 2/1985 | Schumacher | F03B 17/063 416/122 |
| 4,813,849 | A * | 3/1989 | Grujanac | F04B 19/12 261/86 |
| 6,083,382 | A * | 7/2000 | Bird | B01D 61/06 210/143 |
| 6,152,017 | A | 12/2000 | Raible | |
| 6,983,308 | B1 | 1/2006 | Oberhaus et al. | |
| 7,470,105 | B2 * | 12/2008 | de Oliveira | F04D 29/183 415/77 |
| 7,836,780 | B2 | 11/2010 | Garnett et al. | |
| 8,061,444 | B2 | 11/2011 | Mullins et al. | |
| 8,062,258 | B2 | 11/2011 | Demarais et al. | |
| 8,070,615 | B2 | 12/2011 | Henry et al. | |
| 8,075,413 | B2 | 12/2011 | Henry et al. | |
| 8,079,916 | B2 | 12/2011 | Henry et al. | |
| 8,083,051 | B2 | 12/2011 | Baer et al. | |
| 8,100,301 | B2 | 1/2012 | Babiarz | |
| 8,097,152 | B2 | 2/2012 | Lewis | |
| 8,147,772 | B2 | 4/2012 | Wilford | |
| 8,152,464 | B2 | 4/2012 | Anderson | |
| 8,827,669 | B2 * | 9/2014 | North | F04C 18/084 418/194 |
| 2010/0296958 | A1 * | 11/2010 | North | F04C 18/084 418/201.3 |

FOREIGN PATENT DOCUMENTS

WO 2008086575 A1 6/2008
WO 2010015848 A1 2/2010

OTHER PUBLICATIONS

Rorres, "The Turn of the Screw: Optimal Design of an Archimedes Screw", F.J. of Hydraulic Engineering, Jan. 2000.

Dailey and Oleson, "Sennacherib, Archimedes, and the Water Screw", Technology and Culture, vol. 44, (Jan. 2003).

Dailey, "Communication", Technology and Culture, vol. 50 Jul. 2009.

Fuentes, A: 19.6 Generation and Geometry of Zi (INVOLUTE) Worms; Gear Geometry and Applied Theory, Second Edition, 2004; [Retrieved on Jan. 24, 2013] from <URL: http://www.globalspec.com/reference/62684/203270/19-6-generation-and-geomttry-of-zi-involute-worms>, entire document.

* cited by examiner

Panel A          Panel B

Figure 7

Panel A — Volume = 1 Helicoid
Panel B — Volume = 1.087 Strake

METHODS AND APPARATUS FOR MOVING FLUID USING A STRAKE

CROSS REFERENCE TO RELATED APPLICATIONS

This application is the US national application of PCT/US2013/061366, filed on 24 Sep. 2013 and which claims priority to US Provisional Application No. 61/704,753, filed 24 Sep. 2012, the disclosure of which is herein incorporated by reference in its entirety.

BACKGROUND

Field of Invention

The present invention relates to methods and apparatus for raising or lowering a volume of a fluid such as water using an Archimedes screw-type device. More specifically, the present invention incorporates a strake shape as a blade to increase the volume of fluid previously obtained using a helicoid shape.

Description of Related Art

The Archimedes Screw is a device used to raise or lower a fluid, usually water, from one level to another. When used for raising water, energy is supplied to turn the screw, and when used to lower water, energy is generated by the turning of the screw.

The Archimedes Screw is one of the oldest machines in use. Its invention has traditionally been credited to Archimedes, an ancient Greek mathematician and engineer, who lived in the third century BC.

Figure 1:
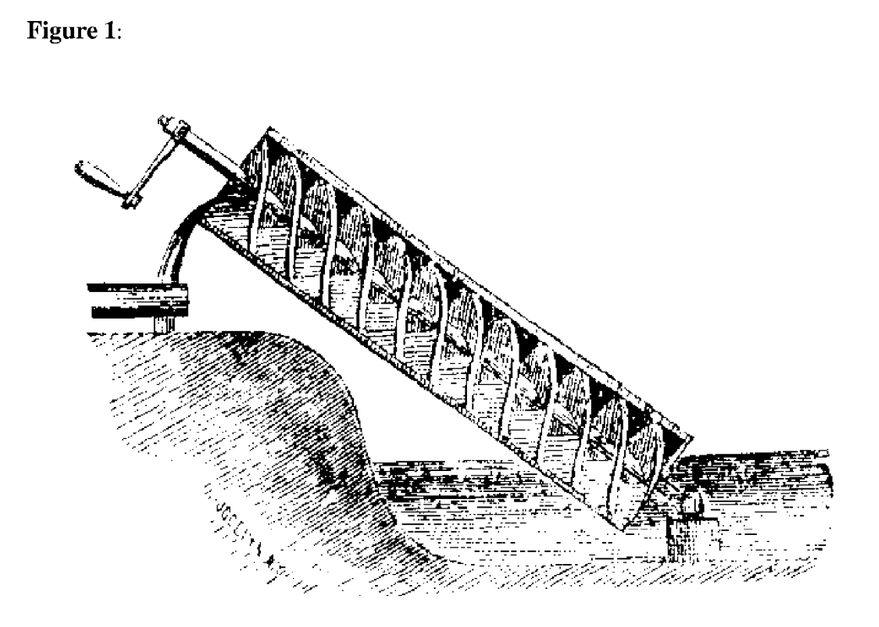
FIG. 1 an illustration of an Archimedes Screw from antiquity for raising water from a lower reservoir to an upper reservoir.

FIG. 1 shows the basic design of an Archimedes Screw from antiquity that is used to raise water. It consists of an inner cylinder or core wrapped by blades (also called "starts" or "flights") and an outer cylinder enclosing the blades. Its bottom end is immersed in a body of water (the "lower reservoir") and water is raised to the top end (the "upper reservoir"). When tilted as shown, water is trapped in "buckets" formed by the two cylinders and the blades. As the entire devise is rotated by the crank at the top, the action of the screw motion causes these buckets of water to be lifted from the lower to the upper reservoir.

In antiquity and up to the last century, the main uses of the Archimedes Screw were to irrigate fields from a low-lying stream or river; to raise storm water out of low-lying land; and to drain water from mines.

Figure 2:
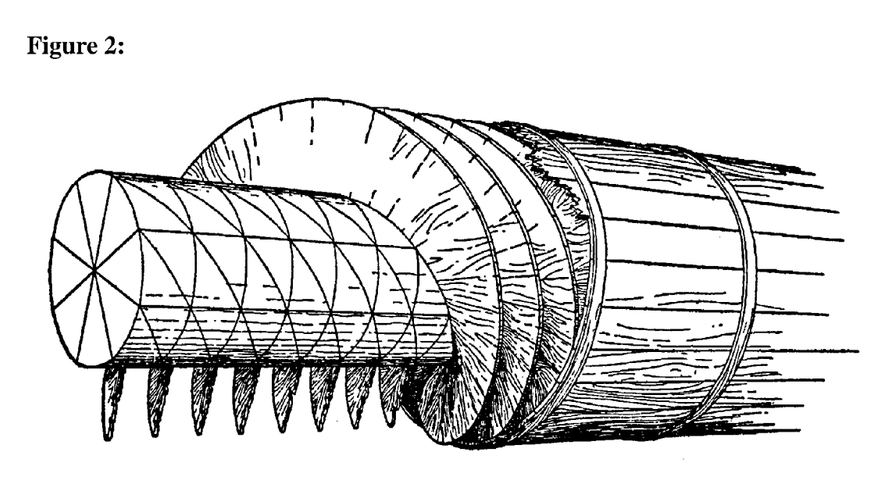
FIG. 2 an illustration of the internal design of an ancient Archimedes Screw showing helicoid blade shape.

FIG. 2 is an illustration of an Archimedes Screw described by the Roman Engineer Vitruvius in the first century BC. The inner cylinder is shaped from the trunk of a tree, the outer cylinder is constructed from planks, and the eight intertwined blades are built up from the long flexible twigs from willow trees. All parts were nailed together and sealed with tar to eliminate leakages. The blade shape in FIG. 2 is called a helicoid and has so far been the only shape used for Archimedes Screws.

Present-day uses of the Archimedes Screw include applications in wastewater treatment facilities, low-lying land-pumping stations (such as found in The Netherlands or the Gulf coast region), irrigation systems, rain-detention dams, flood-detention dams, fish-conveyor systems, or water sports and recreational activities, all using the helicoid blade design.

Figure 3:
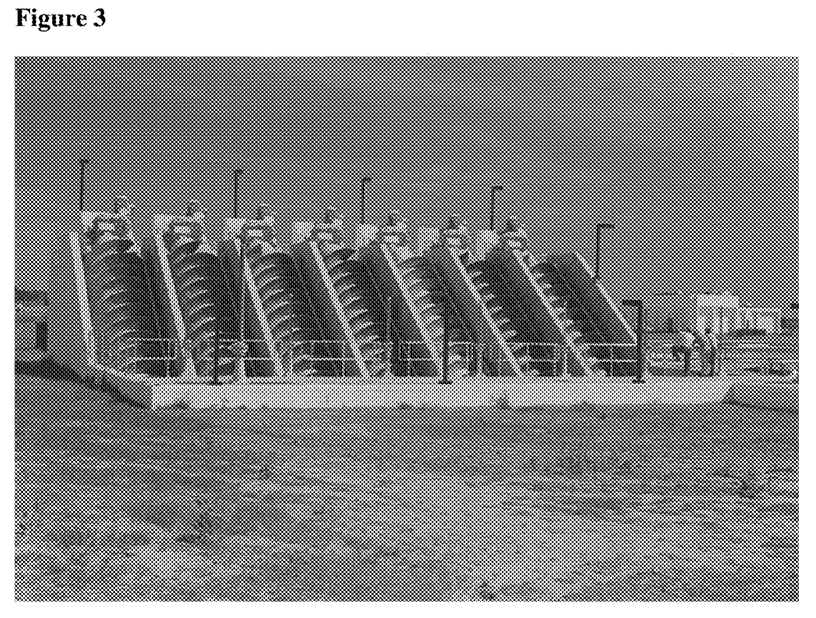
FIG. 3 an image of an Archimedes Screw used in moving water at a wastewater treatment plant.

Within the United States the Archimedes Screw is used most frequently in wastewater treatment plants. FIG. 3 shows seven Archimedes Screws used to pump wastewater in a treatment plant in Memphis, Tenn., USA. Each of these Screws is 96 inches (2.44 meters) in diameter and can lift 19,900 gallons per minute. The Screws were manufactured by the Lakeside Equipment Company of Bartlett, Ill., USA. In modern installations, the outer cylinder that covered the screw in antiquity is usually replaced by a stationary half-cylinder trough in which the screw blades attached to the inner cylinder rotate. When used to raise water, the screw is turned by an electric or diesel motor.

Figure 4:
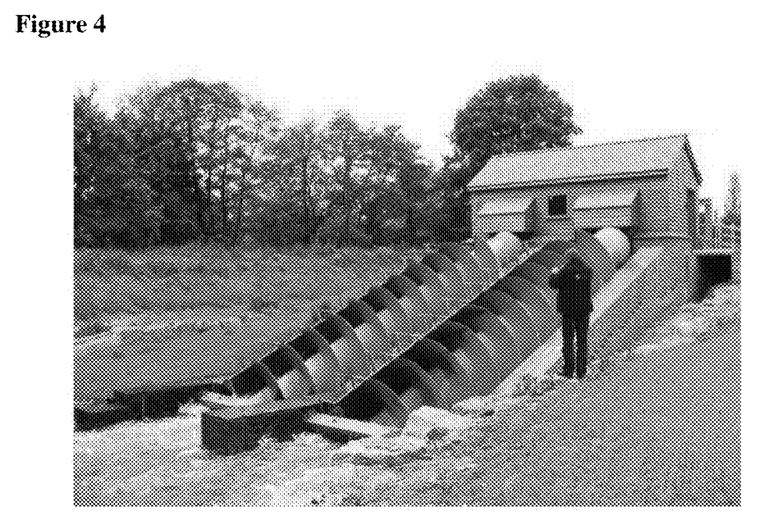
FIG. 4 an image of an Archimedes Screw used in hydroelectric power generation.

Within the last twenty years, a new application of the screw has been discovered in the generation of electricity. For such applications, Archimedes Screws are also called hydropower screws. FIG. 4 shows one such installation in Germany in which two screws are set next to a stream and part of the flow of the stream is diverted to the top of the screws. The weight of the water causes the screws to turn, driving an electrical generator located in the shed. There are hundreds of sites throughout Europe equipped with these hydropower screws, and they are now becoming available in the United States.

Figure 5:
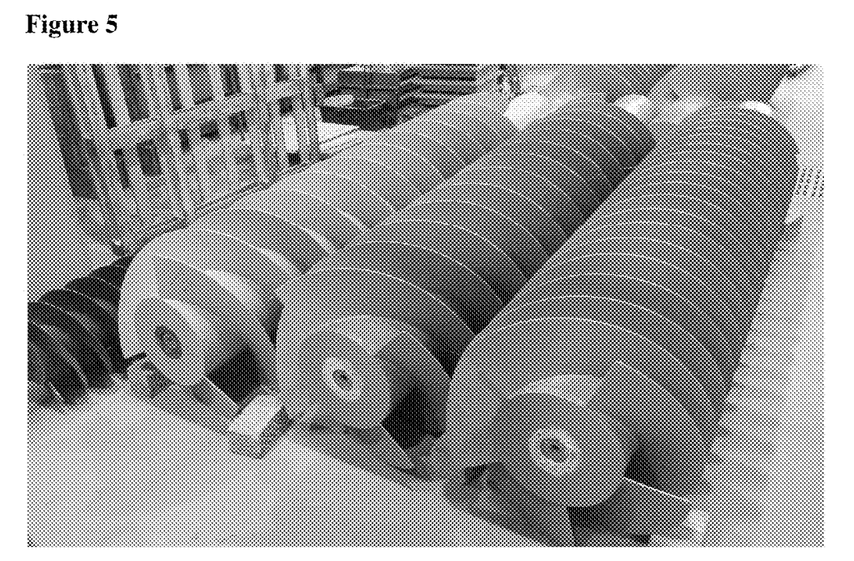
FIG. 5 an image of Archimedes Screws having helicoid blades with 3, 4, and 5 intertwined blades.

FIG. 5 shows screws in a manufacturing plant. Almost all screws manufactured today have 3, 4, or 5 intertwined blades, as shown.

In each of the uses described above, the screw is designed with a helicoid shape that requires extensive, high-cost, manufacturing procedures in fabricating the helicoid blade. The high cost is primarily due to the stretching and compressing necessary to obtain the desired shape. The helicoid shape itself has a limited fluid volume available for filling each bucket during movement of the screw.

Therefore, there exists a need to increase the capacity of individual buckets and thus improve the efficiency of fluid being moved through the screw and also improve the manufacturing process to reduce the high cost of fabricating a helicoid shape.

SUMMARY

The present invention provides improved methods, apparatus, and manufacture of an Archimedes Screw using a strake design as a blade to increase the volume of water raised or lowered by about 10%. The invention, in part, alters the shape of the blades within the screw from a helicoid shape to a strake shape. A helicoid blade in an Archimedes Screw has been used since antiquity and has not changed since then, limiting the efficiency and manufacturing process. The strake shape allows a greater quantity of water to be contained within the screw and has a developable surface that enables easier fabrication than the helicoid shape.

Thus the present invention describes a more efficient strake blade having a low cost fabrication with applications wherever a volume of fluid is needed to be moved between a lower reservoir and an upper reservoir. The fluid is usually water, but is applicable to any type of liquid needed to be raised or lowered from one reservoir to another. Because the present invention increases the quantity of fluid per bucket, contents in the fluid are less subject to damage. Contents in the fluid could include wildlife such as fish when the invention is applied with a moving body of water such as a creek or stream. Fluid components could also include blood cells or platelets when moving body fluids such as blood or plasma. The present invention also has applications for moving granular material such as, but not limited to, sand upward from a lower reservoir to an upper reservoir, having applications in filling sand bags and the like.

Finally, the present invention has applications in generating electricity using fluid movement across the device in order to turn generators (hydropower screws).

DETAILED DESCRIPTION OF INVENTION

Figure 6:
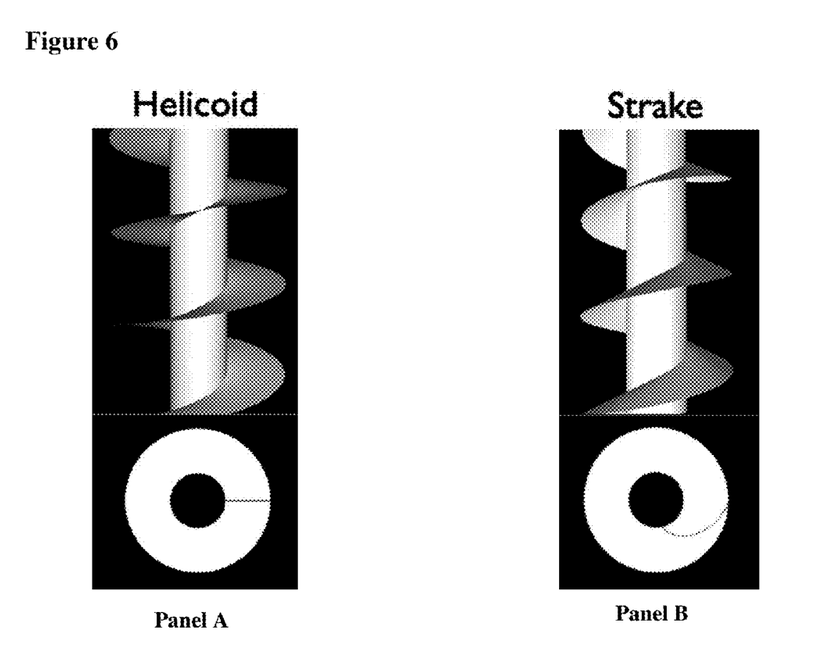
FIG. 6 an image comparing a helicoid blade design with a strake blade design. Panel A shows the helicoid blade in profile and cross section. Panel B shows the strake blade in profile and cross section.

Panel A in FIG. 6 shows the profile and cross section of an Archimedes Screw with a single blade of the design used since antiquity. The shape of the blade is that of a mathematical surface known as a helicoid. The blade wraps around the inner cylinder along a curve known as a helix. As can be seen from the cross-sectional view, the intersection of the blade with a plane perpendicular to the inner cylinder is a straight line.

Panel B in FIG. 6 shows the profile and cross section of a screw with a blade of the proposed design. The shape of the blade of the proposed design is that of a surface called a strake.

The embodiment of the present invention incorporates the strake surface in the blades of an Archimedes Screw. The screw is tilted and rotated in a clockwise direction (as viewed from the top) to lift water, or rotated in the counterclockwise direction by falling water to generate electricity.

Figure 7:
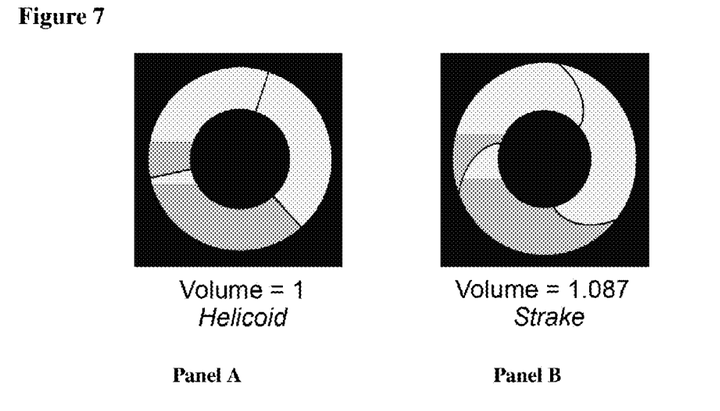
FIG. 7 an image of the cross sections from the helical design (Panel A) and strake design (Panel B) showing water levels in gray.

The embodiments of the present invention have two principal advantages over the present design. The first advantage is an increase of the amount of water that can be raised or lowered with each turn of the screw. The present design has been described and its design optimized (Rorres, C. "The Turn of the Screw: Optimal Design of an Archimedes Screw", *Journal of Hydraulic Engineering*, January 2000, Volume 72, pages 72-80). The publication describes the design of a screw with helicoid blades that maximizes the amount of fluid raised or lowered with each turn. The optimal design is in terms of the best ratio of the diameter of the inner cylinder to the outer cylinder and the best spacing between the turns of a single blade (the pitch of the screw). These results have been adopted in the manufacture of screws A similar analysis for the optimal design of the screw when the blades have the shape of a strake has been applied in the present application. In FIG. 7 the results for a 3-bladed screw with both a helicoid blade and a strake blade are shown. Both screws have the same outer diameter and the same tilt angle, but their inner diameters and pitches are slightly different because the optimal values of these parameters differ slightly for the two types of screws.

FIG. 7 shows the cross section of the two types of screws with the water profile within the screws shown in gray. If the volume of the water lifted or lowered with each turn of the helicoid screw is taken as one unit, then the corresponding volume for the strake screw is 1.087 units. Thus the strake screw can lift or lower 8.7% more water with each turn of the screw.

Table 1 summarizes the fractional increase in the volume capacity of a strake screw over a helicoid screw for screws with 2 to 25 blades. This table was computed by the inventor of the present invention using a MATLAB™ program, owned by MathWorks Inc., to determine the optimal volume capacities for each type of screw. In all cases the optimal values of the design parameters of the screws were computed and used (i.e., the ratio of the diameters of the inner and outer cylinders and the pitches of the screws)

As seem from Table 1, for the most common screws in production—screws with 3, 4, or 5 blades—the percentage improvements are 8.7%, 9.6% and 10.3%, respectively. As the number of blades increases further the percentage gains also increase, up to more than 13%. But it is presently impractical to construct screws with more than five blades.

TABLE 1

| Blades | Fractional Increase |
| --- | --- |
| 2 | 0.062 |
| 3 | 0.087 |
| 4 | 0.096 |
| 5 | 0.103 |
| 6 | 0.109 |
| 7 | 0.113 |
| 8 | 0.117 |
| 9 | 0.118 |
| 10 | 0.120 |
| 11 | 0.123 |
| 12 | 0.124 |
| 13 | 0.125 |
| 14 | 0.126 |
| 15 | 0.126 |
| 16 | 0.128 |
| 17 | 0.128 |
| 18 | 0.128 |
| 19 | 0.129 |
| 20 | 0.130 |
| 21 | 0.130 |
| 22 | 0.130 |
| 23 | 0.131 |
| 24 | 0.132 |
| 25 | 0.131 |

Figure 8:
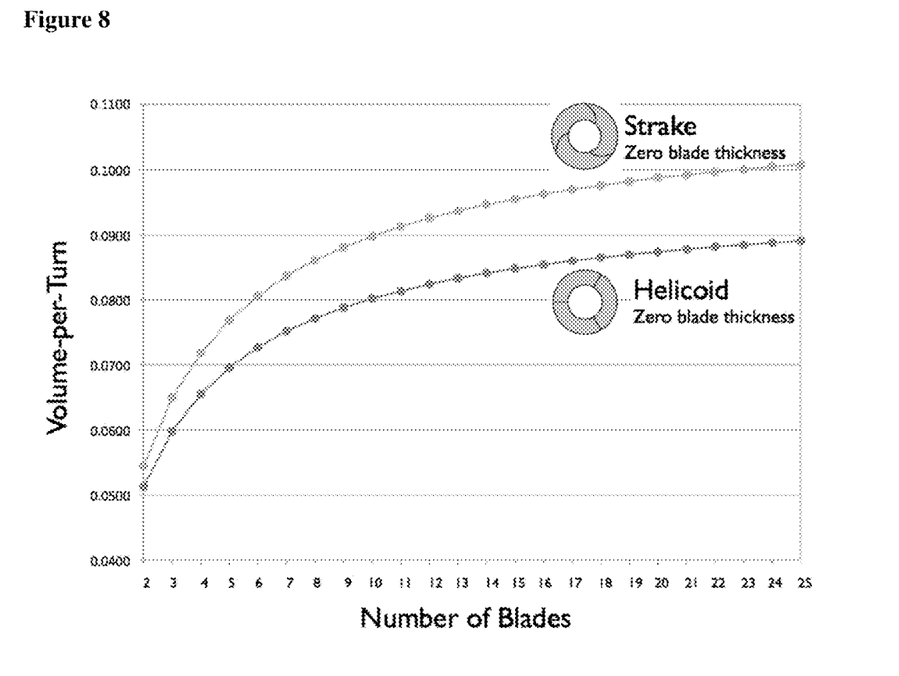
FIG. 8 graph of the per-turn volume capacity of a helicoid and a strake design.

FIG. 8 expresses the data in Table 1 in graphical form. In the graph certain normalized units are used for the volume-per-turn.

The second advantage that blades in the form of a strake have over blades in the form of a helicoid is that the strake is a developable surface, while the helicoid is not. A developable surface is one that can be formed by bending a flat surface without stretching or compressing it. Fabricating a developable surface by bending a flat sheet of metal, for example, is inexpensive and cost-effective compared to deforming it into a nondevelopable surface.

Figure 9:
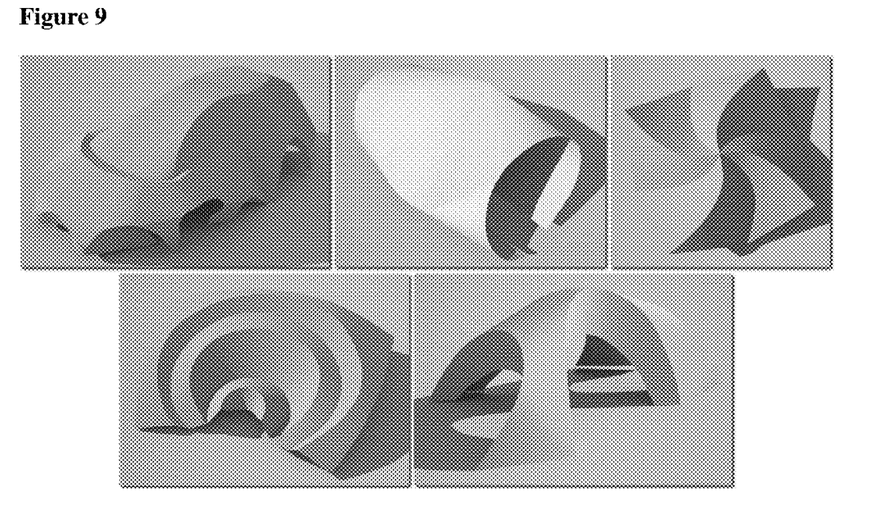
FIG. 9 a representative sample of objects made of bendable, flat pieces of paper.

FIG. 9 shows some objects made up of individual developable surfaces connected along their edges. All of these complicated surfaces where made from flat pieces of stiff paper, which can be bent, but not stretched or compressed. A strake blade can be made with such a stiff piece of paper, but a helicoid blade cannot.

Mathematical Derivation of a Strake

In this section a mathematical derivation of the strake surface and formation from a flat surface is shown. A knowledge of analytic geometry as presented in a first course in Calculus is assumed on the part of the reader.

In a Cartesian xyz-coordinate system, the intrinsic equations of a strake surface with inner radius a and outer radius b with intrinsic parameters s and t are:

$$x = a(\cos t + s \sin t)$$
$$y = a(\sin t - s \cos t)$$
$$z = c(t - s)$$

or $$\begin{vmatrix} x \\ y \\ z \end{vmatrix} = \begin{vmatrix} a\cos t \\ a\sin t \\ ct \end{vmatrix} + s \begin{vmatrix} a\sin t \\ -a\cos t \\ -c \end{vmatrix}.$$

The spacing between turns of the strake (the pitch of the screw) is $2\pi c$. For one turn of the strake the intrinsic parameters run through the following values:

$$0 \le t \le 2\pi \text{ and } 0 \le s \le \sqrt{b^2 - a^2}/a.$$

Figure 10:
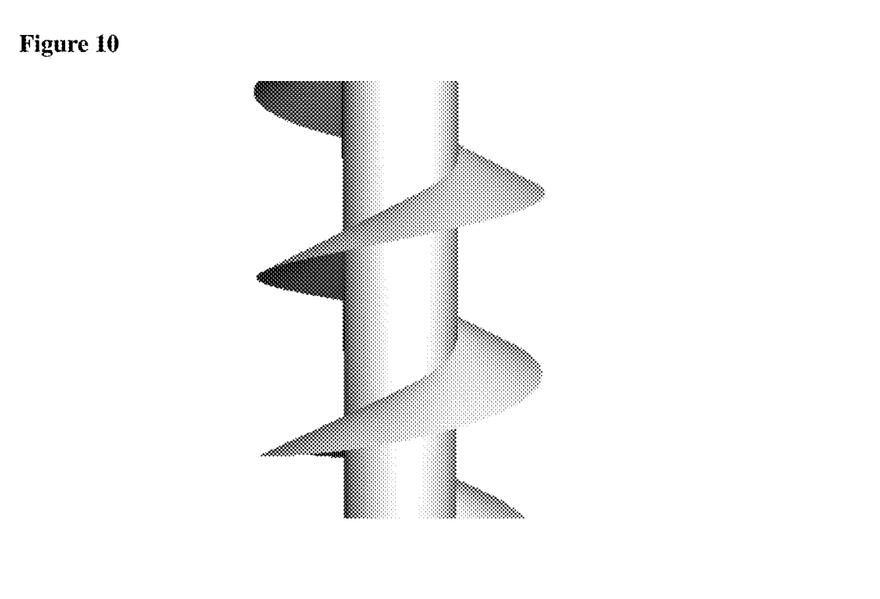
FIG. 10 view of strake showing x-axis horizontal and z-axis vertical, both in plane of the paper.

A strake with parameters a=2, b=5, and c=1 is shown in FIG. 10 in which the x- and z-axis are in the plane of the paper with the x-axis horizontal and the z-axis vertical. The inner cylinder of radius a in the figure is not part of the strake, but is shown to indicate how a strake appears in a screw.

The inner helix of the strake (at s=0) has parametric equations $$\begin{vmatrix} x \\ y \\ z \end{vmatrix} = \begin{vmatrix} a\cos t \\ a\sin t \\ ct \end{vmatrix}.$$

The outer helix (at $s=\sqrt{b^2-a^2}/a$) has parametric equations $$\begin{vmatrix} x \\ y \\ z \end{vmatrix} = \begin{vmatrix} a\cos t \\ a\sin t \\ ct \end{vmatrix} + \sqrt{b^2 - a^2} \begin{vmatrix} \sin t \\ -\cos t \\ -c/a \end{vmatrix}.$$

$$\begin{vmatrix} x \\ y \\ z \end{vmatrix} = \begin{vmatrix} b\cos(t - \delta) \\ b\sin(t - \delta) \\ c(t - \tan\delta) \end{vmatrix}$$

where $$\tan\delta = \frac{\sqrt{b^2 - a^2}}{a}.$$

At t=0 the point on the outer helix is $$\begin{vmatrix} a \\ -\sqrt{b^2 - a^2} \\ -c\sqrt{b^2 - a^2}/a \end{vmatrix}.$$

The length of one turn of the inner helix is $L_i = 2\pi\sqrt{a^2+c^2}$ and the length of one turn of the outer helix is $L_o = 2\pi\sqrt{b^2+c^2}$.

Figure 11:
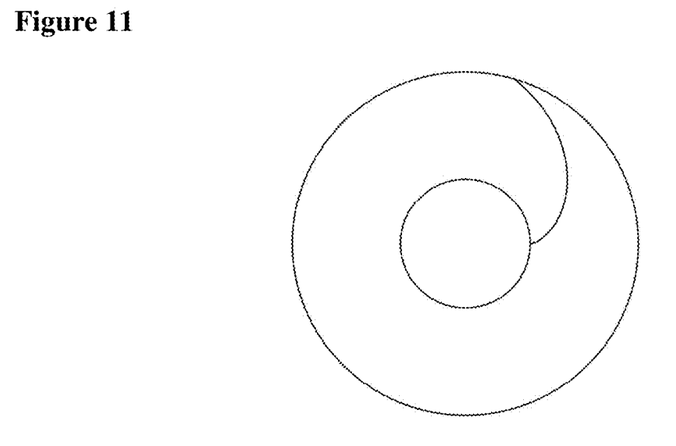
FIG. 11 view of a strake with plane z=0, a=3 and b=8.

The intersection of the strake with the plane z=0 has the parametric equations $$x = a(\cos t + s \sin t)$$
$$y = a(\sin t - s \cos t)$$
$$z = 0$$

for $$0 \le t \le \frac{\sqrt{b^2 - a^2}}{a}.$$

and is shown in FIG. 11 for a=3 and b=8. (The two circles of radii a and b are not part of the strake.) This intersection is part of a spiral curve with turns that are almost equally spaced.

Figure 12:
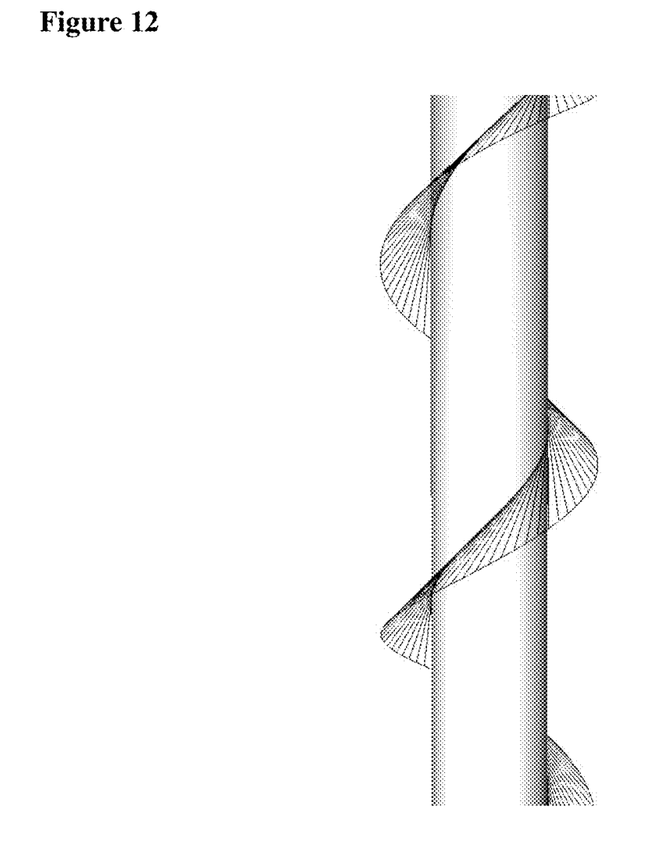
FIG. 12 view of a strake generated by tangent lines to the inner heliz.

The strake is generated by the tangent lines to the inner helix, as shown in FIG. 12. These tangent lines are called the generators of the strake and the helix is called the generating curve (or edge of regression) of the strake.

The tangent to the inner helix at t=s=0 is at the point $$\begin{vmatrix} 0 \\ -a \\ 0 \end{vmatrix}$$

and cuts the outer helix at t=0 and $s=\sqrt{b^2-a^2}/a$ at the point $$\begin{vmatrix} a \\ -\sqrt{b^2 - a^2} \\ -c\sqrt{b^2 - a^2}/a \end{vmatrix}.$$

The line segment between these two points has length $$L = \sqrt{(b^2 - a^2)\left(1 + \left(\frac{c}{a}\right)^2\right)}.$$

Figure 13:
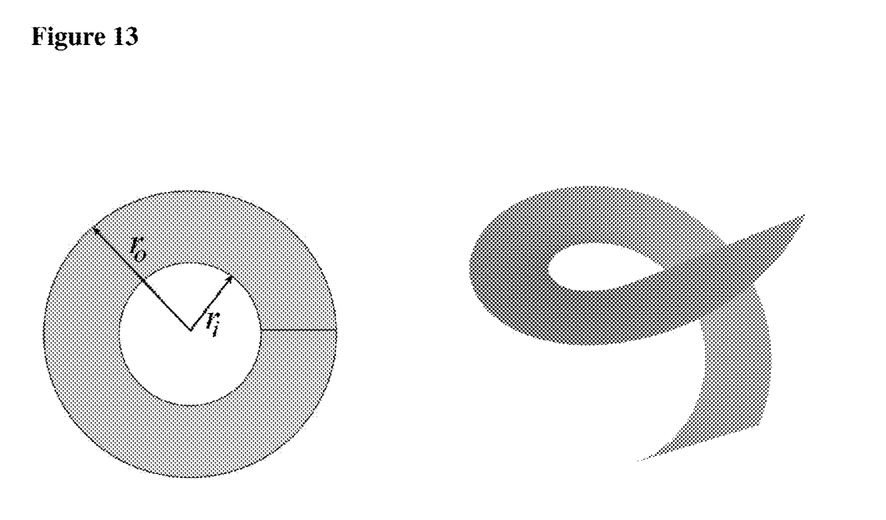
FIG. 13 planar view of strake design. Panel A planar view with inner radius $r_i$ and outer radius $r_o$ Panel B showing formation without stretching.

Because a strake is a developable surface, it can be formed without stretching from a planar region, as shown in FIG. 13.

The planar region in FIG. 13 is a silted annular region of inner radius $r_i$ and outer radius $r_o$ where $$r_i = a\left[1 + \left(\frac{c}{a}\right)^2\right]$$

and $$r_o = b\sqrt{\left[1+\left(\frac{c}{a}\right)^2\right]\left[1+\left(\frac{c}{b}\right)^2\right]}.$$

One complete annual region forms slightly more than one complete turn of the strake; namely, $$\sqrt{1+\left(\frac{c}{a}\right)^2}$$

turns. In this way, a strake with many turns can be fabricated from many silted planar annular regions that are sequentially connected along their slits.

The contents of the articles, patents, and patents applications and all other documents and electronically available information mentioned or cited herein, are hereby incorporated by reference in their entirety to the same extent as if each individual publication was specifically and individually indicated to be incorporated by reference. Applicant reserves the right to physically incorporate into this application any and all materials and information from any such articles, patents, patent applications, or other physical and electronic documents.

The terms and expressions used herein have been used as terms of description and not of limitation, and there is no intention in the use of such terms of excluding any equivalents of the features shown and described or portions thereof. It is recognized that various modification are possible within the scope of the invention claimed. Thus, it should be understood that although the present invention has been specifically disclosed by preferred embodiments and other features, modification and variation of the invention embodied therein herein disclosed may be used by those skilled in the art, and that such modification and variations are considered to be within the scope of this invention.

I claim:

1. An Archimedes screw comprising at least one strake shaped blade forming a bucket attached to an inner cylinder, the at least one strake shaped blade represented by parametric equations in an xyz-coordinate system in which an x-axis and a y-axis are in-plane axes crossing perpendicularly to each other in a cross section of the at least one stake shaped blade with a z-axis crossing perpendicularly to the x-y axis plane along an axis of the inner cylinder, wherein x=a*(cos t+s*sin t); y=a*(sin t−s*cos t); and z=c*(t−s) where a is a radius of the inner cylinder, c represents spacing between turns of the at least one strake shaped blade having a pitch of 2πc, and s and t are intrinsic parameters of the parametric equations.

2. The Archimedes screw of claim 1 having an outer cylinder partially or completely enclosing the at least one strake shaped blade.

3. The Archimedes screw of claim 2 having 2 or more intertwined strake shaped blades.

4. The Archimedes screw of claim 1 wherein a volume of fluid in the bucket is 1.087 times more than a volume of fluid in a bucket formed by a helicoid shaped blade.

5. The Archimedes screw of claim 4 wherein the fluid is selected from a group consisting of water, Newtonian fluids, non-Newtonian fluids, organic solutions, inorganic solutions, and biological fluids.

6. A device for generating electrical energy from a moving body of water comprising:
  a. an upper reservoir of moving water;
  b. a lower reservoir; and
  c. an Archimedes screw having at least one strake-shaped blade forming a bucket attached to an inner cylinder, the at least one strake-shaped blade represented by parametric equations in an xyz-coordinate system in which an x-axis and a y-axis are in-plane axes crossing perpendicularly to each other in a cross section of the at least one strake-shaped blade with a z-axis crossing perpendicularly to the x-y axis plane along an axis of the inner cylinder, wherein x=a*(cos t+s*sin t); y=a*(sin t−s*cos t); and z=c*(t−s) where a is a radius of the inner cylinder, c represents spacing between turns of the at least one strake-shaped blade having a pitch of 2πc, and s and t are intrinsic parameters of the parametric equations, wherein the Archimedes screw has an upper end in fluid communication with the moving water such that water movement to the lower reservoir rotates the Archimedes screw in such a manner whereby connection to a generator will generate electrical power.

7. The device of claim 6 having 2 or more intertwined strake shaped blades.

8. The device of claim 6 wherein a volume of water in a bucket formed by a single strake shaped blade is 1.087 times more than a volume of water in a bucket formed by a helicoid shaped blade.

9. A method for moving a fluid comprising:
  a. placing one end of a longitudinal axis of an Archimedes screw in fluid communication with a lower reservoir, the Archimedes screw having at least one strake shaped blade forming a bucket attached to an inner cylinder, the at least one strake shaped blade represented by parametric equations in an xyz-coordinate system in which an x-axis and a y-axis are in-plane axes crossing perpendicularly to each other in a cross section of the at least one strake shaped blade with a z-axis crossing perpendicularly to the x-y axis plane along an axis of the inner cylinder, wherein x=a*(cos t+s*sin t); y=a*(sin t−s*cos t); and z=c*(t−s) where a is a radius of the inner cylinder, c represents spacing between turns of the at least one strake shaped blade having a pitch of 2πc, and s and t are intrinsic parameters of the parametric equations;
  b. locating an opposite end of the longitudinal axis of the Archimedes screw in contact with an upper reservoir to allow collection of the fluid; and
  c. rotating the Archimedes screw such that the rotation moves the fluid from the lower reservoir to the upper reservoir.

10. The method of claim 9 wherein fluid is selected from a group consisting of water, Newtonian fluids, non-Newtonian fluids, organic solutions, inorganic solutions, and biological fluids.

11. The method of claim 9 wherein the fluid is water.

12. A method for generating electricity comprising:
  a. locating an Archimedes screw within a moving body of water having an upper reservoir and a lower reservoir, the Archimedes screw having at least one strake-shaped blade forming a bucket attached to an inner cylinder, the at least one strake-shaped blade represented by parametric equations in an xyz-coordinate system in which an x-axis and a y-axis are in-plane axes crossing perpendicularly to each other in a cross section of the at least one strake-shaped blade with a z-axis crossing perpendicularly to the x-y axis plane along an axis of the inner cylinder, wherein $x=a*(\cos t+s*\sin t)$; $y=a*(\sin t-s*\cos t)$; and $z=c*(t-s)$ where a is a radius of the inner cylinder, c represents spacing between turns of the at least one strake-shaped blade having a pitch of $2\pi c$, and s and t are intrinsic parameters of the parametric equations;

b. allowing the moving body of water to be in fluid communication with the upper reservoir such that movement of the moving body of water from the upper reservoir to the lower reservoir rotates the Archimedes screw; and c. generating electricity from the rotating Archimedes screw.

13. A manufacturing process of an Archimedes screw having at least one strake-shaped blade forming a bucket attached to an inner cylinder, the at least one strake-shaped blade represented by parametric equations in an xyz-coordinate system in which an x-axis and a y-axis are in-plane axes crossing perpendicularly to each other in a cross section of the at least one strake-shaped blade with a z-axis crossing perpendicularly to the x-y axis plane along an axis of the inner cylinder, wherein $x=a*(\cos t+s*\sin t)$; $y=a*(\sin t-s*\cos t)$; and $z=c*(t-s)$ where a is a radius of the inner cylinder, c represents spacing between turns of the at least one strake-shaped blade having a pitch of $2\pi c$, and s and t are intrinsic parameters of the parametric equations, where the at least one strake-shaped blade is formed by bending a planar developable surface without stretching or compressing the developable surface.

14. The manufacturing process of claim 13 wherein the at least one strake-shaped blade is formed by bending a slit planar surface without stretching or compressing to form one complete turn of the at least one strake-shaped blade.

15. The manufacturing process of claim 14 wherein two or more complete turns of the at least one strake-shaped blade are sequentially connected along their slits.

* * * * *